Figure 5:
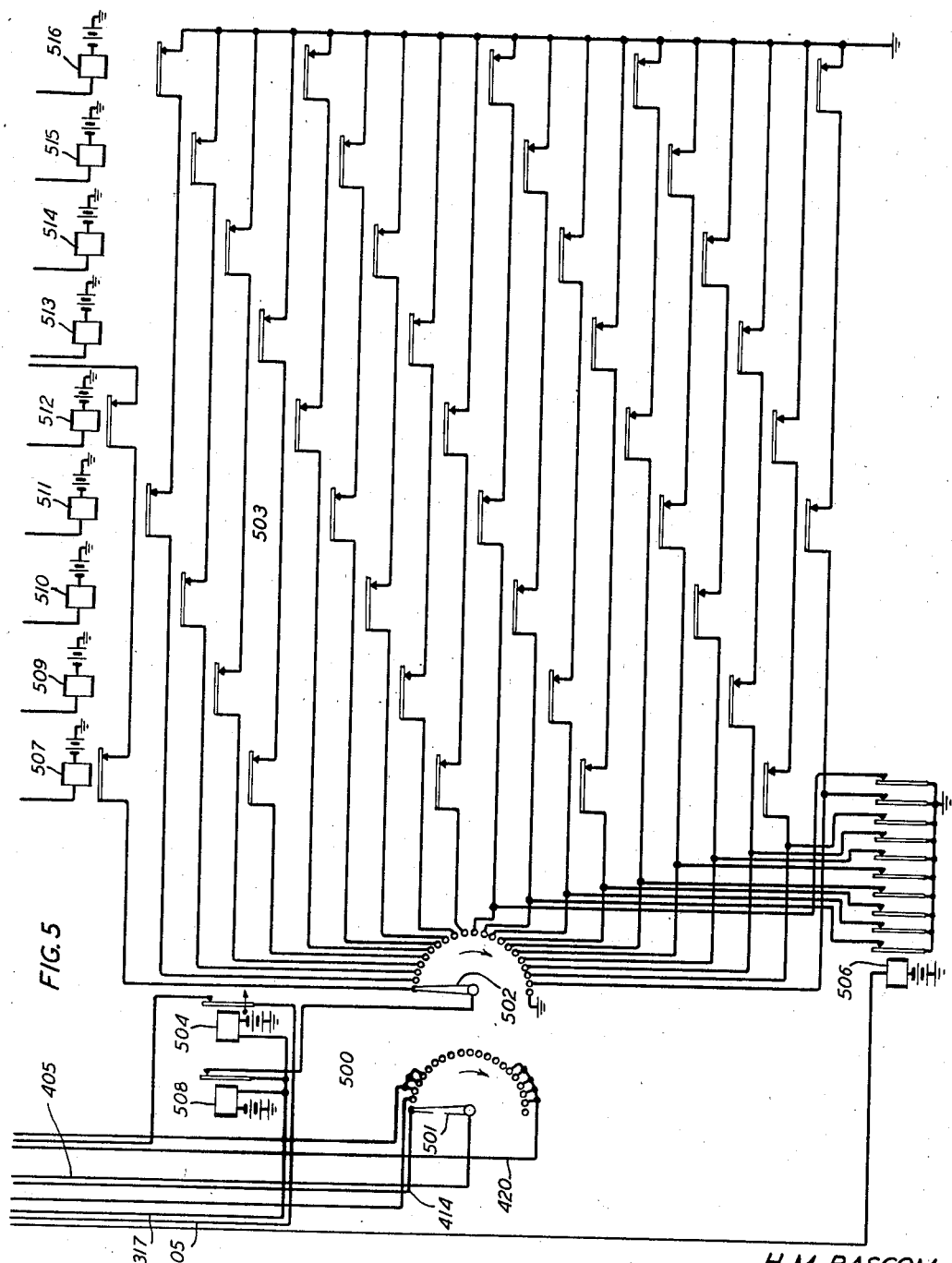

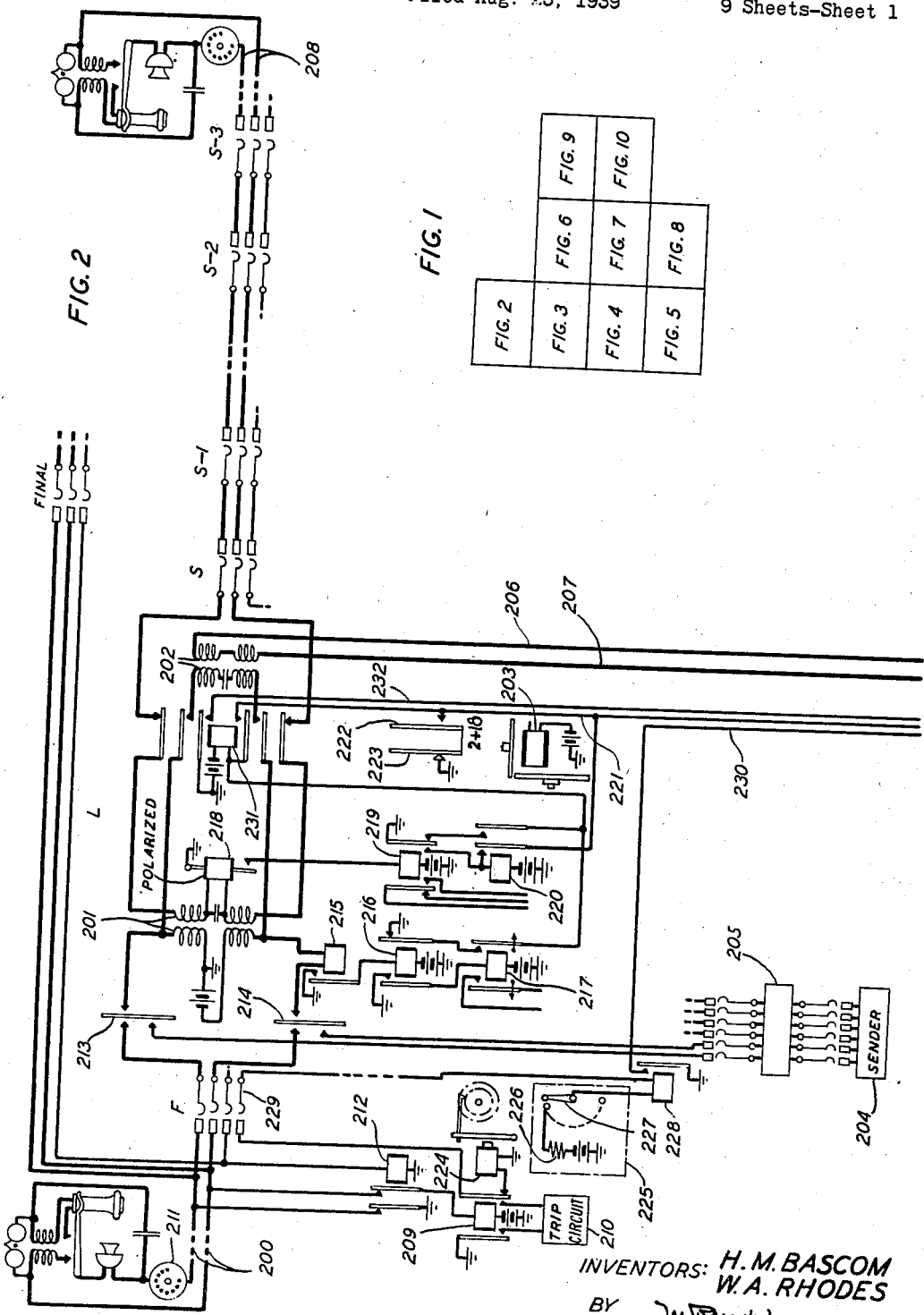

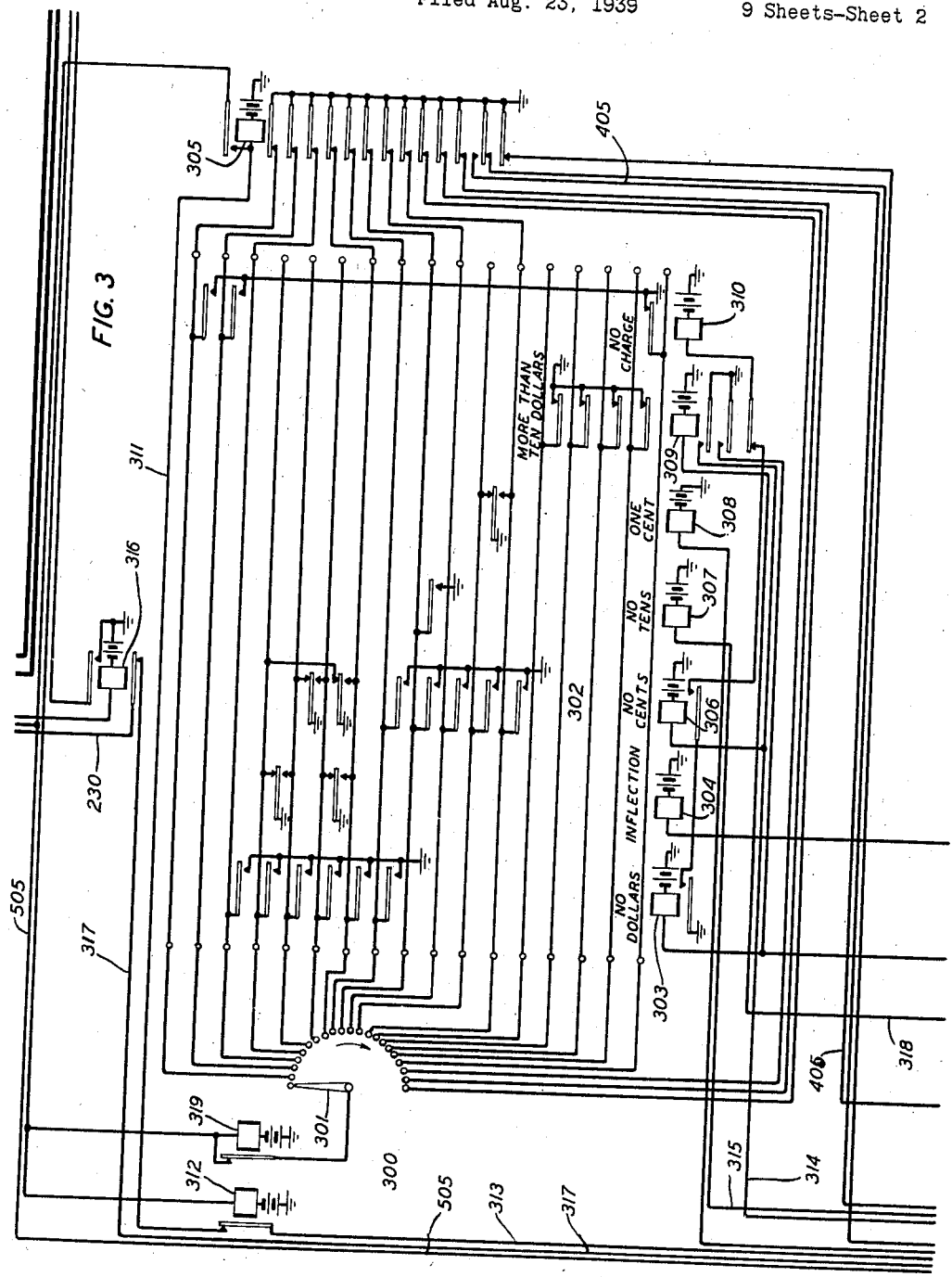

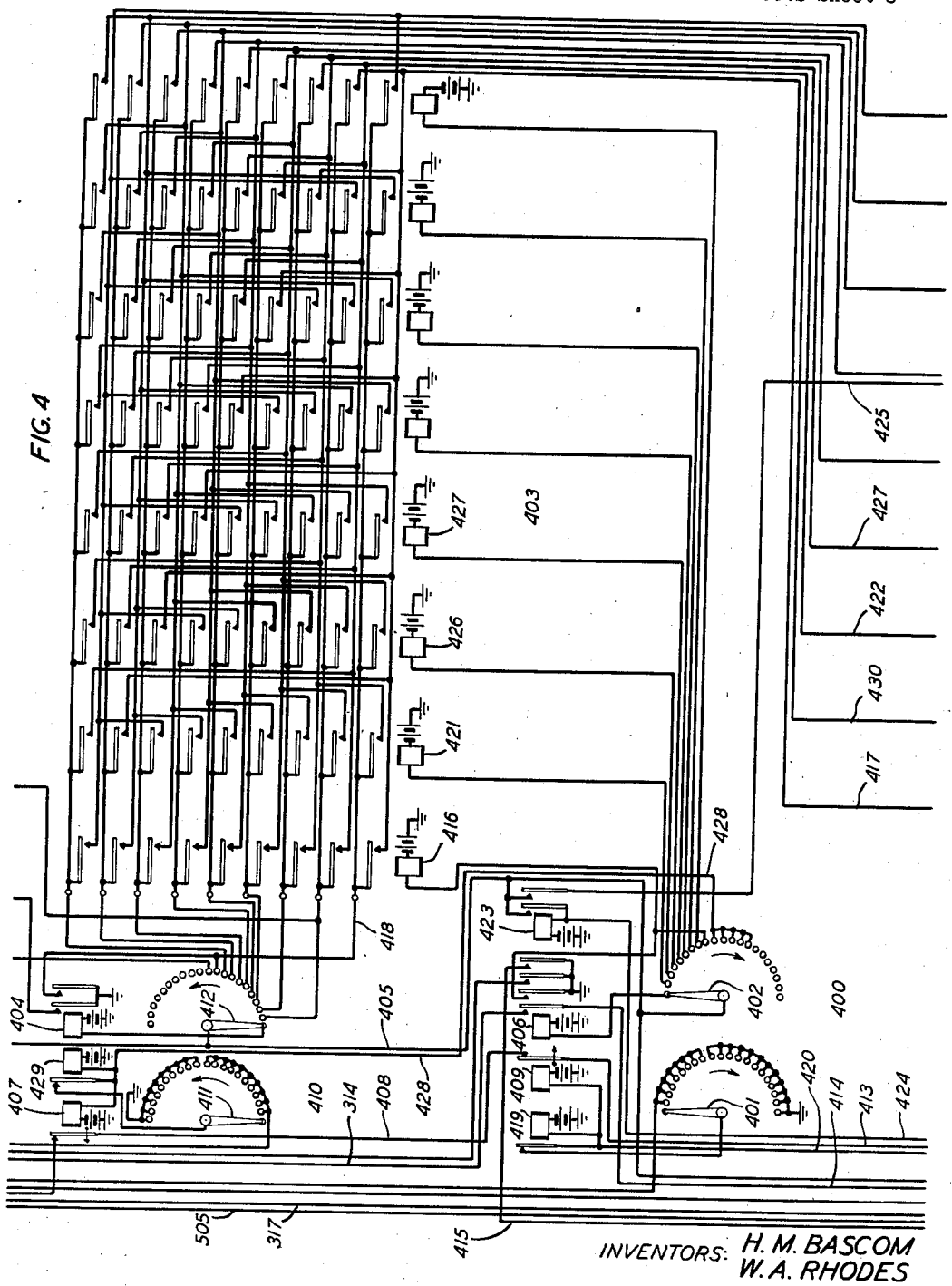

Oct. 13, 1942.　　　H. M. BASCOM ET AL　　　2,298,453
SERVICE MEASURING SYSTEM
Filed Aug. 23, 1939　　　9 Sheets-Sheet 4

INVENTORS: H. M. BASCOM
W. A. RHODES
BY
ATTORNEY

FIG. 7

Oct. 13, 1942.  H. M. BASCOM ET AL  2,298,453
SERVICE MEASURING SYSTEM
Filed Aug. 23, 1939   9 Sheets-Sheet 7

INVENTORS: H. M. BASCOM
W. A. RHODES
BY
ATTORNEY

Oct. 13, 1942.   H. M. BASCOM ET AL   2,298,453
SERVICE MEASURING SYSTEM
Filed Aug. 23, 1939   9 Sheets-Sheet 8
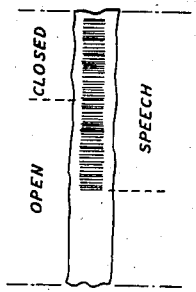
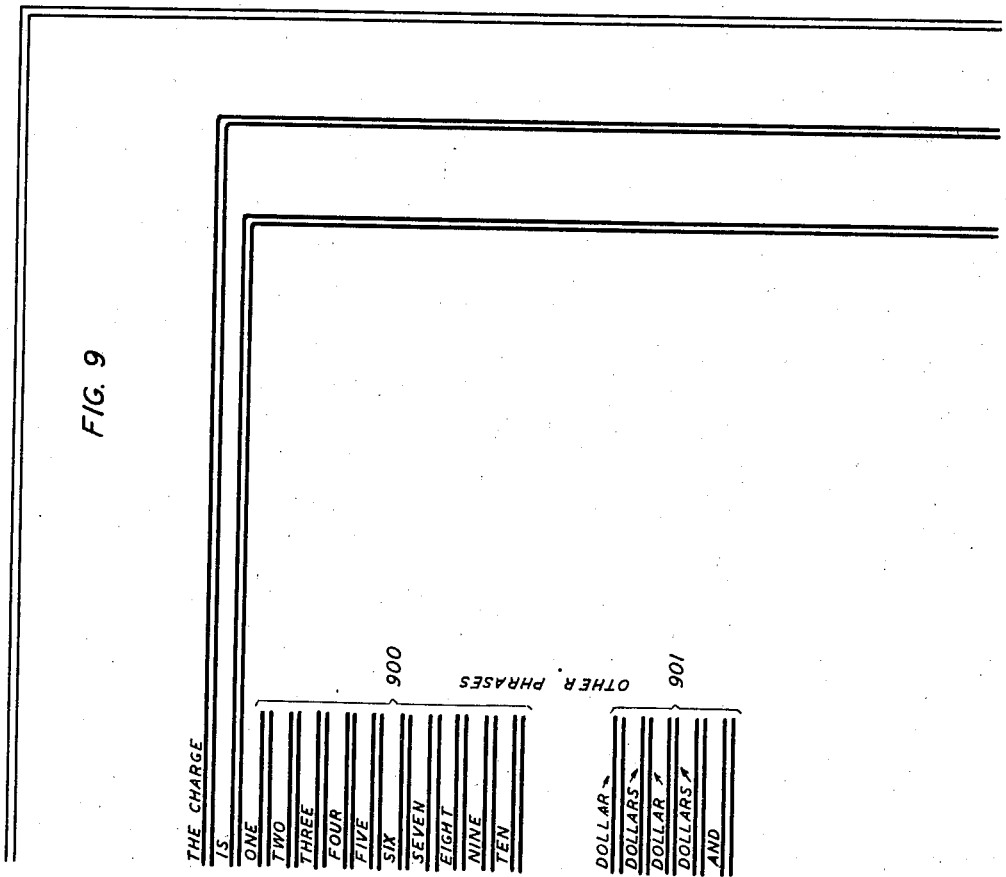
INVENTORS: *H. M. BASCOM*
*W. A RHODES*
BY
ATTORNEY Oct. 13, 1942.   H. M. BASCOM ET AL   2,298,453
SERVICE MEASURING SYSTEM
Filed Aug. 23, 1939   9 Sheets-Sheet 9
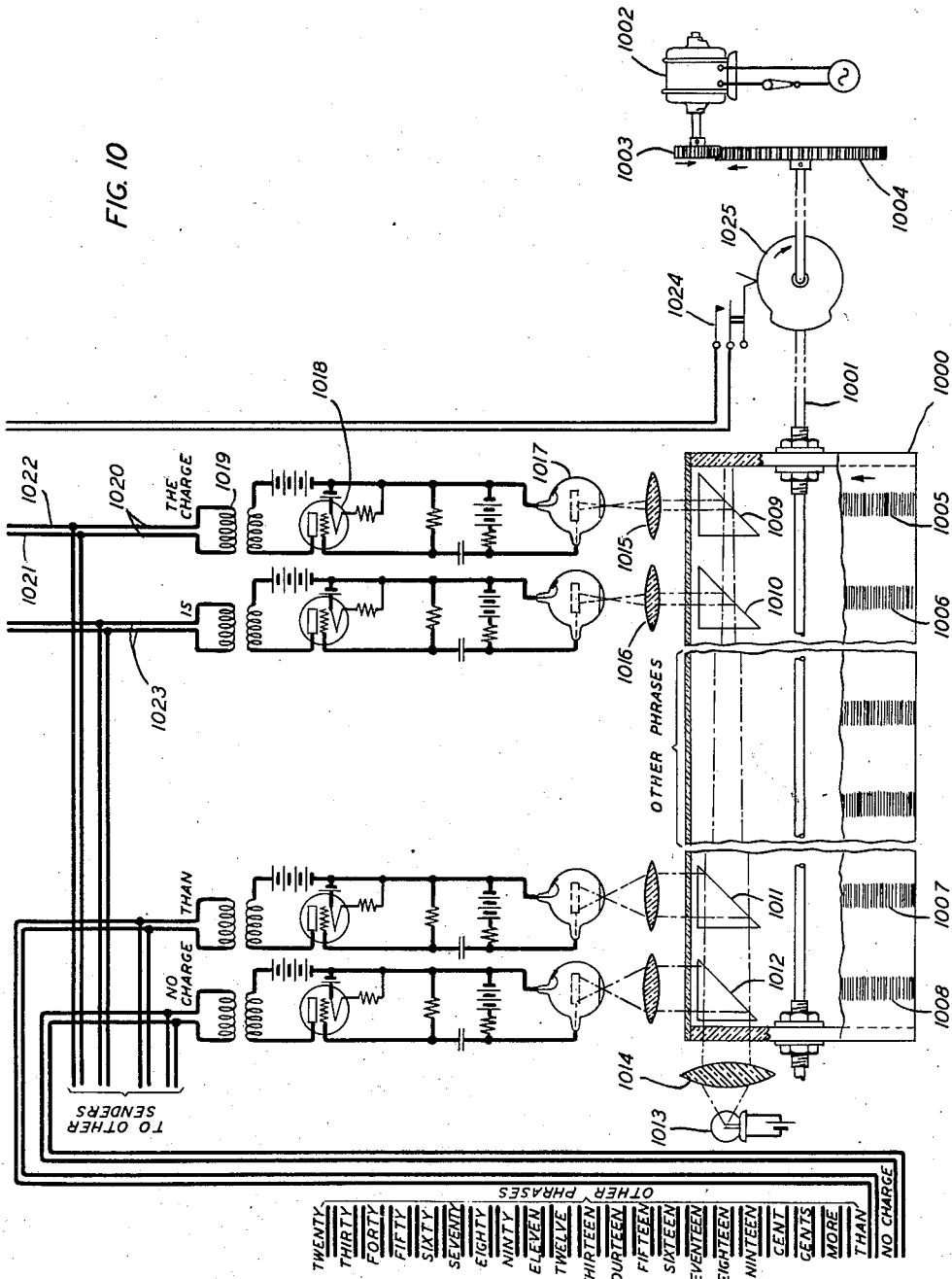
INVENTORS: H. M. BASCOM
W. A. RHODES
BY [signature]
ATTORNEY Patented Oct. 13, 1942

2,298,453

UNITED STATES PATENT OFFICE 2,298,453

SERVICE MEASURING SYSTEM

Henry M. Bascom, Brooklyn, and William A. Rhodes, New York, N. Y., assignors to Bell Telephone Laboratories, Incorporated, New York, N. Y., a corporation of New York Application August 23, 1939, Serial No. 291,484

20 Claims. (Cl. 179—7.1)

This invention relates to service measuring systems and particularly to those used for measuring the service rendered to telephone subscribers.

An object of the invention is to determine and compute the charges applicable to calls as they occur and to make this information available immediately.

Another object is to compute the monetary charge applicable to each particular call and to announce the charge automatically to the subscriber or operator at the termination of the call.

Another and related object is to calculate the total charge for a call in accordance with the duration of conversation and to announce the charge to the subscriber or operator when the conversation is completed.

These and other objects of the invention are realized by means of a system in which a timing and charging mechanism operates during the conversational period and causes the repeated operation of the usual message register associated with the calling subscriber's line, and in which a charge computing mechanism associated with the established connection is controlled by the charging mechanism to compute the monetary value of the repeated message register operations as they occur. Thus, as the conversation ensues the computing mechanism keeps an integrated calculation of the successive charge periods and has the total computed charge available whenever the conversation is terminated by the subscribers. At the end of the call an announcing device automatically transmits an oral announcement over the telephone connection to the calling subscriber's station apprising him of the monetary charge for the call he has just completed. This announcing device is provided with sound records capable of expressing sums of varying magnitude, and the computing mechanism selects the particular ones of these records that express the sum applicable to the total computed charge.

A feature of the invention is a controlling circuit arrangement by means of which a subscriber, who has just completed a conversation, is able to initiate the operation of the announcing mechanism at the central office to apprise him of the charge. This control may be exercised by the subscriber by the simple act of opening his line loop momentarily by means of the switchhook or by manipulating his dial. Having done this, he may then listen in his receiver and hear the charge announced. Because this opening of the line is a momentary one the switches connected to the calling line at the central office are not released. However, after the subscriber has heard the charge announced and hangs up his telephone permanently, the established connection and the charge computing mechanism are released to normal.

According to a related feature the calling party may receive the announcement by merely holding his receiver at his ear after the conversation is finished and waiting for the called party to replace his telephone. This act on the part of the called subscriber initiates the operation of the announcing mechanism, and the announcement is sent to the waiting subscriber on the calling line.

A further feature of the invention is an announcing mechanism provided with one sound record for speaking the name of the larger monetary unit, such as "dollar," with a rising inflection if there are units of the lower denomination, such as "cents," following and provided with another record for speaking the larger unit with a falling inflection in case the charge contains no units of the smaller denomination.

The foregoing and other features of the invention are described in the following detailed specification and are disclosed in the accompanying drawings.

Figure 6:
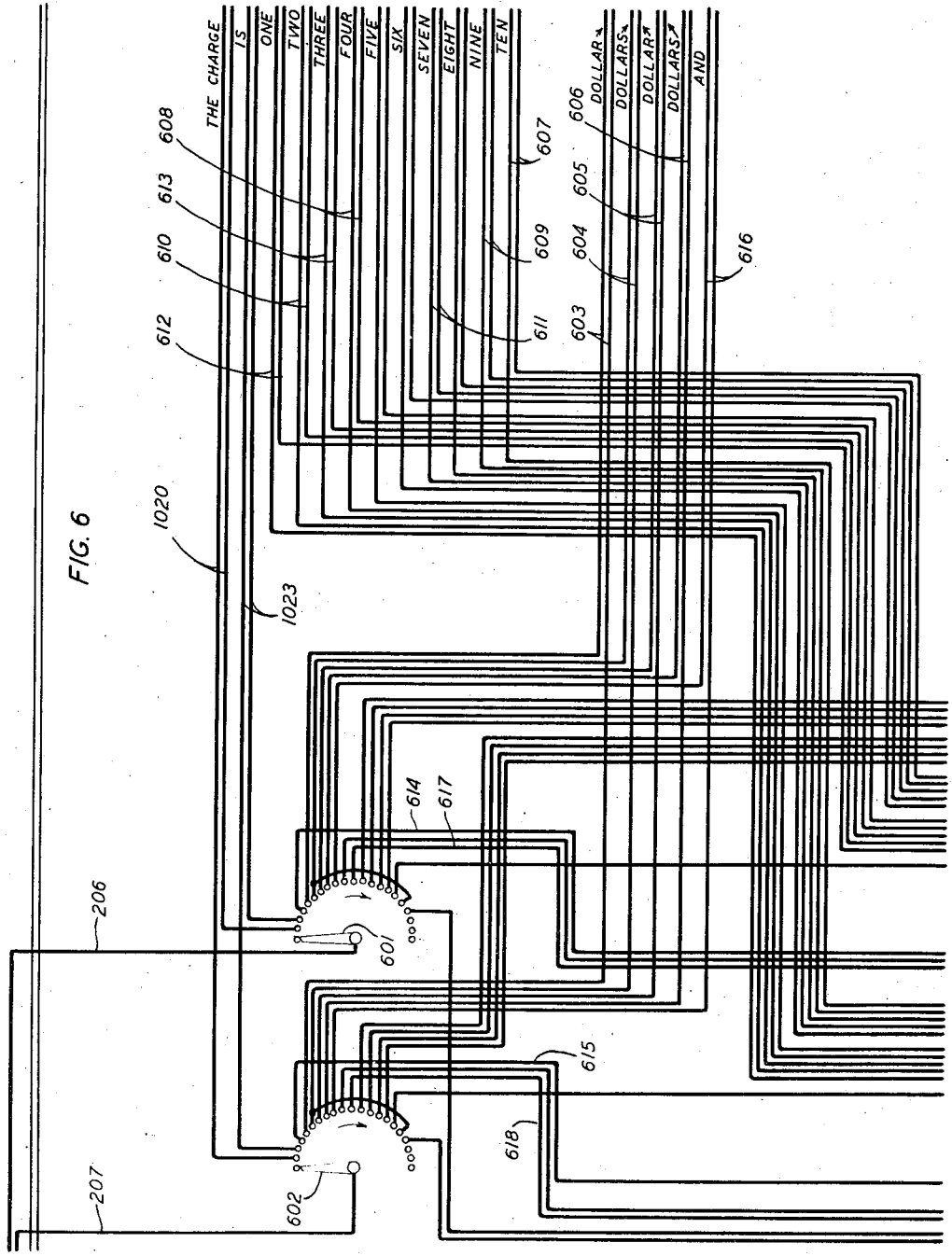
Figure 7:
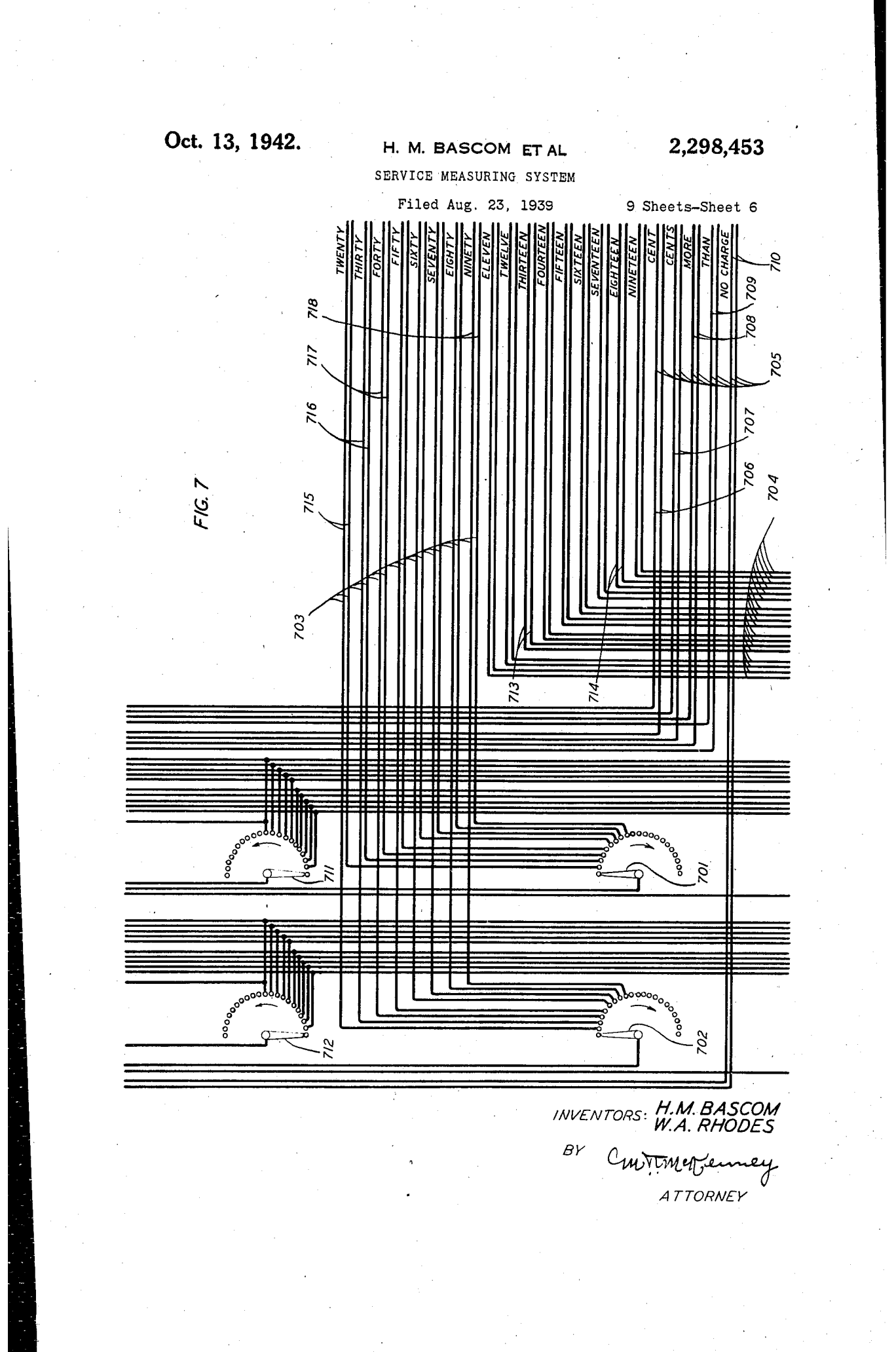
Figure 8:
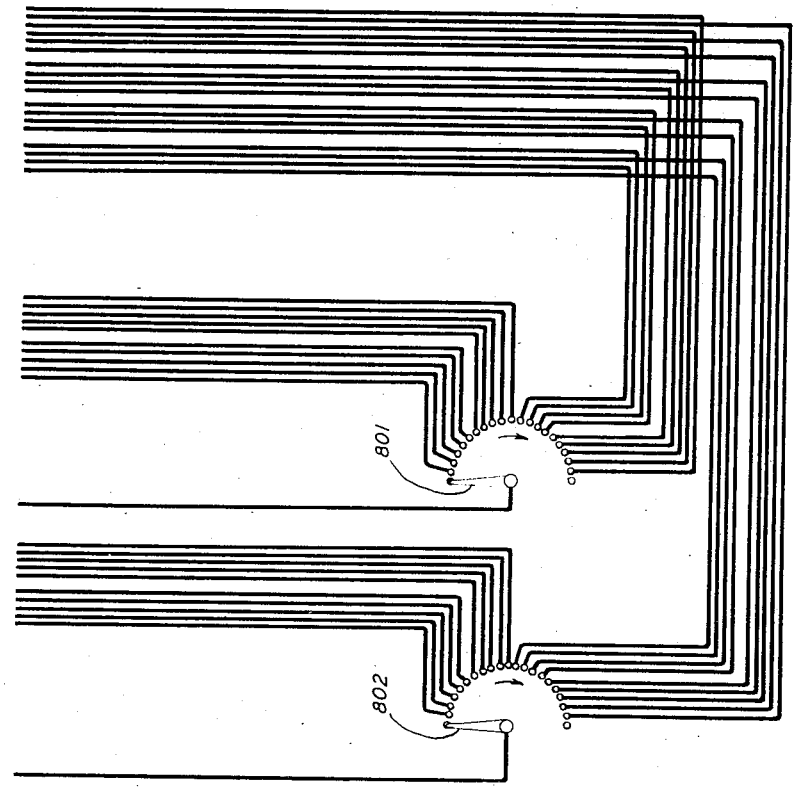

In these drawings, Figs. 2 to 10, when arranged as indicated in Fig. 1, illustrate, partly in diagrammatic manner and partly in detail, an automatic telephone system embodying the features of this invention.

Fig. 2 shows a calling subscriber's line and the line circuit therefor in the central office, illustrates diagrammatically the automatic switches for extending connections to called subscribers' lines, one of which is shown, discloses part of the link circuit interconnecting the line finder and the first or district selector, including call charging means, and illustrates diagrammatically a common register sender for controlling the selector switches;

Figs. 3, 4, 5, 6, 7, 8, and 9 disclose a charge computing mechanism associated with the finder-district link circuit for computing in monetary units the charges accumulating during a telephone conversation;

Fig. 10 shows an announcing device for making oral announcements to apprise the calling subscriber of the charge to be assessed against him; and Fig. 11 illustrates the time relation between the speech record medium and certain other parts of the system.

Although not limited to any particular kind of system the invention has been illustrated in an automatic telephone system employing switches of the well-known panel type. Moreover, the system chosen to illustrate the invention is one in which subscribers' lines are provided with individual registers which are operated repeatedly to charge the calling subscriber during a telephone conversation, the frequency of operation being variable and depending upon the zone into which the call has been extended, and the total charge being proportional to the duration of the conversation. Since the automatic switches, the register senders controlling them, the charging mechanism for operating the message registers in accordance with the zone and duration of the calls, and other parts of the system are well known in the art, their disclosure in the drawings has been limited to those details essential to a full understanding of the present invention. For a more complete disclosure of systems of the kind to which the invention is applicable reference may be had to Collis, 1,837,206 of December 22, 1931; Johnson, 1,550,815 of August 25, 1925; Stearn et al., 1,395,977 of November 1, 1921; and Raymond et al., 1,862,549 of June 14, 1932.

Referring particularly to the drawings, a calling subscriber's line 200 appears at the central office in a line circuit and in the terminal bank of a line-finder switch F. The line circuit includes the usual subscriber's message register 224. The line finder F is individual to a district selector switch S and is interconnected therewith by a link circuit L including repeating coils 201 and 202, a controlling sequence switch 203, together with circuit controlling relays. Also associated with the link L is a time-controlled mechanism 225 for causing repeated operations of the message register during a conversational period. The selector switch S has access to a second or office selector switch S—1 which in turn has access to incoming and final selector switches S—2 and S—3 for extending the connections to called lines.

The central office is also equipped with common register senders, such as the sender 204, and link circuits 205 for associating an idle sender with a calling subscriber's line and with the selector switches by way of the finder-district link circuit L.

The finder-district link circuit L is provided with a charge computing mechanism which includes a units switch 500, a tens switch 400, a hundreds or dollars switch 410 and a steering switch 300. The switch 500 is provided with four contact banks and associated brushes 501, 502, 801 and 802. This switch responds to the successive impulses sent to the calling subscriber's message register during the conversation and computes in cents the charge corresponding to these register operations. Although any desired rate of charge may be chosen, the computing mechanism illustrated is designed to compute total charges on the basis of four and a half cents for each operation of the subscriber's message register. Since the switch 500 has twenty contact positions it is possible to compute the first four of these four-and-one-half-cent charges during the first rotation of the switch over its contact banks. At the end of the first rotation of switch 500 the tens switch 400 is advanced one position, indicating charges between twenty and thirty cents. Thereafter the switch 500 makes use of only half of its terminal points per revolution, each revolution corresponding substantially to ten cents. Similarly each of these succeeding rotations of the switch 500 causes the advance of the tens switch 400 indicating the successive tens values of the charges. For each rotation of the tens switch 400, corresponding substantially to a charge of one dollar, the dollars switch 410 is advanced one position. The tens switch 400, like the units switch 500, has four contact banks and associated brushes 401, 402, 701 and 702; similarly the dollars switch 410 has four banks and associated brushes 411, 412, 711 and 712.

It will be noted that the assumed charge unit (four and a half cents) contains a fraction of a cent. To avoid the use of fractional units in billing the subscriber and in announcing to him charges for the individual calls he makes, the computing mechanism is designed to compute the total charges, as they accumulate, to the nearest half cent, omitting the half cent wherever it occurs in the total charge. It is necessary therefore to vary the number of steps taken by the switch 500 responsive to successive operations of the message register. With the four-and-one-half-cent unit per message register operation it follows that any computed total charge is obtained by adding alternate increments of four and five cents. This method avoids the fractional cent and favors the subscriber wherever this fraction occurs. For example, the first message register operation at the beginning of the conversation causes the units switch 500 to take four steps, indicating a charge of four cents; the next charge causes the switch to take five steps, indicating a total of nine cents or two units of four and a half cents each. The third operation causes the switch to take four steps, the fourth causes it to take five steps, and so on. However, the eighteen steps, taken by the switch 500 in its first rotation to compute the first four charges, is not divisible into the twenty effective positions of the switch; nor is the number nine, corresponding to the two charges made for each successive rotation of the switch 500, divisible into the ten positions of the switch which are effective for these rotations. In order, therefore, that the switch 500 may always advance, first four, then five, then four, then five positions, and so on, it is necessary to make each successive movement of the switch 500 dependent on the hundreds and tens digits of the total charge then accumulated. This control of the unit switch 500 is obtained by the relay group 503. The relays of this group are controlled jointly by the tens and dollars switches 400 and 410. For this purpose a group of multi-contact relays 403 is provided, the operating circuits of these relays being controlled by the switch 400 and the multiple grid associated with the contacts of these relays being controlled by the dollars switch. With this arrangement the relays of the group 503 are dependent for their operation jointly on the positions of switches 400 and 410, that is, on the values of the hundreds and tens digits of the charge. The armatures of the relays of group 503 are wired to the terminals of switch 500 and determine, therefore, the position to which the switch will step once it is started in response to an impulse transmitted from the finder-district link when a charge is made on the subscriber's message register.

The steering switch 300 is provided with three rows of terminals and associated wipers 301, 601 and 602. The right windings of the repeating coil 202 are connected over conductors 206 and 207 to the wipers 601 and 602 of the switch 300. By advancing these wipers from position to position the steering switch serves to extend the talking circuit, including the calling subscriber's line, either directly or by way of the computing switches 410, 400 and 500 to the announcing machine shown in Fig. 10. The announcement may comprise several phrases and words, the character of which is determined by the settings of the computing switches; and the steering switch advances from position to position to select the successive phrases and words composing the full announcement.

The announcements are made to the calling subscriber by the sound reproducing machine shown in Fig. 10, which is common to a plurality of the links L and their associated charge computing mechanisms. The announcing machine includes a transparent drum 1000 mounted on a shaft 1001 which is rotated by a motor 1002 through the gear wheels 1003 and 1004. Wrapped about the exterior surface of the transparent drum 1000 are a series of sound films, each of which has one or more words recorded thereon. These separately recorded words form the component parts of the announcements.

Although the invention is not so limited, the system disclosed is arranged to announce the value of all computed charges up to ten dollars, any charge thereover being announced as one that is more than ten dollars. The films for making these announcements are arranged in series along the length of the drum 1000. The first expression, which occurs in all announcements, except when "no charge" is announced, is "the charge," and the film 1005 on which these words are recorded is disposed at the extreme right end of the drum 1000. The next word, also used in all announcements, except no charge announcements, is the word "is," which is recorded on the second film 1006. Following the film 1006 are a series of ten films bearing consecutively the words "one," "two," "three," etc., to "ten." These ten records are used to announce both the cents and the dollars in any given charge. The next two films contain the words "dollar" and "dollars," respectively, both of which are spoken with a falling inflection. These films are selected when the charge is one that does not involve cents. The next two films contain the words "dollar" and "dollars," respectively, with a rising inflection, and these films are selected for charges involving cents as well as the dollar or dollars. The next film on the drum 1000 contains the word "and" which is used when required to join the word "dollar" or "dollars" with the following cents.

Next on the drum 1000 are the series of eight films bearing, respectively, the words "twenty," "thirty," "forty," "fifty," "sixty," "seventy," "eighty," and "ninety." Following these are a series of nine films bearing, respectively, the words "eleven," "twelve," "thirteen," "fourteen," "fifteen," "sixteen," "seventeen," "eighteen," and "nineteen." The next two films contain the words "cent" and "cents," respectively. The next two films contain the words "more" and "than," respectively, these words being used for the announcement "more than ten dollars." The film 1007 bearing the word "than" is shown in the drawings. Finally, the last film 1008 on the drum contains the words "no charge."

Each of the record films on the drum 1000 is provided with an individual photoelectric reproducing system. These reproducing systems include the successive prisms 1009, 1010, 1011 and 1012 mounted within the drum 1000 and serving to direct the light received from the source 1013 by way of lens 1014 through the transparent drum and the respective sound films to the external lenses 1015, 1016, etc. Light from each of these lenses serves to operate an individual photoelectric reproducing and amplifying system. For example, the light received from the lens 1015 serves to energize the photoelectric cell 1017, and the currents produced thereby are amplified by an amplifier 1018 and applied through the transformer 1019 to the announcing circuit 1020. The conductors 1021 and 1022 of the announcement circuit 1020 are connected respectively to the No. 2 position terminals of wipers 601 and 602. The conductors of the announcing circuit 1023 are connected to the No. 3 position terminals of brushes 601 and 602. The announcing circuits 900 for the words "one" to "ten," inclusive, appear in the first half of the terminal rows of the wipers 711 and 712 of the associated with switch 410 and likewise in the first half of the terminal rows associated with the wipers 801 and 802 of the units switch 500. The announcing circuits 901, pertaining to the dollars, appear in the fifth, sixth, seventh, eighth, and ninth position terminals associated with brushes 601 and 602 of the steering switch. The announcing circuits 703 appear consecutively in the first terminal positions associated with brushes 701 and 702 of the tens switch 400. The announcing circuits 704 appear in the second half of the terminal rows associated with the brushes 801 and 802 of the units switch 500. The final five announcing circuits 705 appear in the second half of the terminal rows associated with the brushes 601 and 602 of the steering switch 300.

The terminal row cooperating with brush 301 of the steering switch is wired to the various contacts of the relays of group 302. The relays of this group are operated in varying combinations under the control of the computing switches and serve to govern the operation of the switch 300 during its movement through an announcing period.

The relay 303 of the group 302 operates if the computed charge involves no dollars. This relay in its operated condition causes the switch 300 to pass over the positions pertaining to those words used in an announcement involving a charge which includes one or more dollars. The operating circuit of relay 303 is closed at the front contacts of relay 404, the latter relay being operated as long as the dollars switch 410 remains in position 1, indicating that the charge is less than one dollar. The energizing circuit for relay 404 may be traced from battery through the winding thereof, brush 412 in position 1, conductor 405 to ground at the front contacts of the relay 305, which is operated in a manner to be explained hereinafter. With the relay 303 in its operated position ground potential is placed on the fourth, fifth, sixth, seventh, eighth, and ninth position terminals associated with the wiper 301 of the steering switch 300. With these terminals grounded the switch 300 passes over them in its cycle of operations, skipping the announcement pertaining to dollar charges.

Relay 304 of the group 302, together with relays 303 and 306, controls the inflection of the dollar and dollars announcement. As above noted, relay 303 distinguishes between charges which involve dollars and those which do not. Relay 306 operates only if the charge is one involving no cents, indicating an integral number of dollars. The operating circuit of relay 306 is closed through the front contact of relay 406 and the first position of wiper 501, relay 406 being operated and wiper 501 being in its first position for all charges involving dollars only. The energizing circuit of relay 304 extends through the second position of wiper 412 which indicates that the charge is at least one dollar but not as much as two dollars. For example, if the charge is assumed to be an even dollar, relay 303 remains deenergized, relay 304 operates, and relay 306 operates. With this combination it will be noted that ground potential is absent from the fifth position terminal of wiper 301. Switch 300 is permitted, therefore, to stop momentarily in its fifth position as it rotates through its cycle of operation, and as a result the announcement circuit 603 is extended over wipers 601 and 602, to the repeating coil 202. Thus the word "dollar" with the falling inflection is included as part of the announcement. If the charge includes a plural number of dollars without cents, relays 303 and 304 remain deenergized and relay 306 operates. With this combination ground potential exists on the fifth position terminal and is absent from the sixth position terminal of wiper 301. Switch 300, therefore, is stepped automatically over the fifth position and is permitted to stop momentarily in the sixth position where the announcement circuit 604 is extended to the repeating coil 202. Hence the word "dollars" with the falling inflection is included in the announcement. If it is assumed that the charge includes a single dollar and a number of cents, relay 303 and 306 remain deenergized and relay 304 operates. Inspection will show in this case that switch 300 passes quickly over positions 5 and 6 and stops momentarily in position 7. In position 7 the announcement circuit 605, pertaining to the dollar with the rising inflection, is connected to wipers 601 and 602 to the repeating coil 202. Finally, if it is assumed that the charge includes a plural number of dollars and a number of cents relays 303, 304 and 306 all remain deenergized, and ground potential is placed on the terminals of the fifth, sixth and seventh positions but not on the eighth position terminal of wiper 301. During the announcement cycle, therefore, switch 300 passes quickly over positions 5, 6 and 7 and pauses in position 8 where the announcement circuit 606 is connected to the repeating coil to include the word "dollars" with a rising inflection.

Relay 307 of the group 302 operates on a computation in which the number of cents involved is less than twenty, that is, where the tens digit of the total charge, expressed in cents is either zero or one. The operating circuit of this relay is closed at the front contacts of relay 406, which, as above noted, is operated in the first position of the tens switch 400. As will be explained hereinafter, the tens switch remains in position 1 until the accumulated charge exceeds twenty cents and progresses thereafter one step at a time for each additional charge of ten cents. Relay 307 connects ground potential to the tenth position terminal of wiper 301, causing wipers 601 and 602 to pass over the conductors extending to the tens wipers 701 and 702, thus skipping the announcement circuits 703.

If the charge includes a single cent, relay 308 operates in a circuit closed through the second position of wiper 501 of the units switch 500. Relay 308 removes ground from the twelfth position terminal and grounds the thirteenth position terminal associated with wiper 301, permitting the switch 300 to pause on the announcement circuit 706 and pass over announcement circuit 707.

Relay 309 operates on charges exceeding ten dollars, its operating circuit being controlled by the dollars switch 410 in its eleventh position. Relay 309 operates relays 303 and 306 thus grounding all terminals of the announcement positions of wiper 301 except those in the second, third, fourteenth, fifteenth, sixteenth and seventeenth positions. In this case the steering switch 300 pauses in position 2 to announce "the charge," in position 3 to announce "is," skips the intermediate positions and pauses successively in positions 14, 15, 16 and 17 to select announcement circuits 708, 709, 607 and 604 for speaking the corresponding words "more," "than," "ten," "dollars."

If the call is one for which no charge should be made, relay 310 operates over a circuit extending through the back contacts of relay 309 and the front contacts of relays 306 and 303. Inspection of the circuits will show that relays 303 and 306 are both operated and relay 309 is released as long as no charging impulses are received from the message register operating circuits associated with the link L. Relay 310 in operating places ground potential on the terminals in the second and third positions of brush 301, relays 303, 306, and 309 ground the succeeding terminals up to position 17, and relay 310 removes ground potential from the terminal in position 18. Hence the switch 300 passes over all preceding positions and pauses in position 18, where announcement circuit 710 is selected to make the announcement "no charge."

The detailed operation of the system will now be described. For this purpose it will be assumed that the subscriber of line 200 calls the subscriber of line 208 and that the charge computing mechanism operates during the conversation to compute the accumulating charge and to prepare for the subsequent announcement to the calling subscriber of the total amount. When the calling subscriber removes his receiver from the switchhook an obvious circuit is closed for the line relay 209. Relay 209 in conjunction with the well-known trip circuit 210 starts a line finder switch F, selects a set of brushes and places a hunting potential upon the test terminals of the line 200. When the finder F finds the calling line, the line is extended by way of the link circuit L to the first or district selector switch S and a circuit is closed for operating the cut-off relay 212, which causes the release of the line relay 209. Also the calling line is extended by way of a link circuit 205 to a common register sender 204.

The subscriber manipulates his dial 211 to register the wanted designation in the sender 204, and the sender proceeds to control the selective operation of switches S, S—1, S—2 and S—3 to extend the link circuit L to the called line 208. After the connection has been extended to the called line, the controlling sequence switch 203 advances to the talking position, and the calling line 200 is extended by way of the contacts of cams 213 and 214 to the left windings of repeating coil 201. The supervisory relay 215 operates in series with the calling line and causes the operation of relay 216. Relay 216 in turn closes an obvious operating circuit for slow-release relay 217. The right windings of the repeating coil are included in the talking circuit extending toward the called subscriber's line, and, when he answers, current is reversed in the well-known manner to operate the polarized supervisory relay 218. Relay 218 operates relay 219 which in turn operates the relay 220. Relay 220 locks through its winding and contact, conductor 221, contacts of sequence switch cams 222 and 223 to ground.

At the time the sequence switch 203 of the link circuit L advances into position 2 it places ground potential on conductor 221 by way of cams 222 and 223 to condition the charge computing mechanism for operation. The ground potential on conductor 221 causes the operation of the relay 305 of the computing mechanism, the circuit for this relay being traceable from battery through the winding thereof, conductor 311, normal contacts of slow-release relay 312, conductor 313, normal contacts of slow-release relay 407, conductor 408, normal contacts of slow-release 409, conductor 413, normal contacts of slow-release relay 504, conductor 505 to ground on conductor 221. It will be noted that the operating circuit of relay 305 extends through the normal contacts of the slow-release relays associated with the stepping magnets of switches 300, 410, 400, and 500, the purpose of which is to insure that relay 305 cannot operate to prepare the computing mechanism unless the switches are at rest. Relay 305 when operated locks through its upper contacts directly to the grounded conductor 221. Relay 305 closes a circuit from ground through its front contact over conductor 405 thence in parallel through the wiper 412 (position 1) and the winding of relay 404 to battery and through wiper 402 (position 1) and relay 406 to battery. Relays 404 and 406 operate. Relay 404 closes an obvious circuit for the operation of relay 303 as explained hereinbefore. Relay 306 is also operated at this time in a circuit from battery through its winding, conductor 314, inner front contacts of relay 406, conductor 414, wiper 501 (position 1), conductor 405 to ground. Relay 406 at its outermost contact closes a circuit over conductor 415 for the operation of relay 506. Relay 506 attracts its armatures and removes ground potential from the terminals corresponding to positions 11 to 20, inclusive, of wiper 502 of the units switch 500. Relay 406 also closes a circuit for relay 307 traceable from battery through the winding of relay 307, conductor 315, to ground at the closed contacts of relay 406. Furthermore, relay 406 closes an operating circuit for the tens relay 416 pertaining to the zero tens. With the dollar switch 410 in position 1, indicating charges involving no dollars, and with the tens relay 416 operated, a circuit is closed for the operation of relay 507 of the group 503, the purpose of which is to determine the stopping positions of the units computing switch 500. The circuit for relay 507 may be traced from battery through the winding thereof, conductor 417, contact of relay 416, conductor 418 to ground at the closed contact of relay 404.

During the conversation the calling subscriber's message register 224 is operated periodically under the control of a timing mechanism 225, the rate of operation depending upon the zone in which the called line is located. The operating circuit for the message register may be traced from battery, resistance 226 thence through brush 227 of a switch or other suitable device, which is operated repeatedly under the control of the timing mechanism, through the winding of relay 228, brush 229 and its associated terminal through the right back contact of line relay 209 and the winding of register 224 to ground. Each time a unit charge is scored on the message register 224, relay 228 operates to close an energizing circuit for the stepping magnet 508 of the units switch 500, and on the following release of relay 228 the magnet 508 advances the wipers of switch 500 one step. The magnet operating circuit may be traced from ground at the front contact of relay 228, conductor 230, closed contacts of relay 316, conductor 317 through the winding of magnet 508 to battery and in parallel therewith through the winding of slow-release relay 504 to battery. As above explained, the slow-release relay 504 holds open the operating circuit of relay 305 while the switch is stepping. The stepping magnet 508 has a self-interrupting circuit extending to the wiper 502, and the switch, once started in response to the metering impulse from relay 228, will step automatically until the wiper 502 reaches an ungrounded terminal. The number of steps taken by the switch 500 is a measure of the number of cents charged for the unit operation in the message register. In general, the switch 500 will move first four steps, then five steps, then four steps, and so on. The stopping positions of the switch depend upon the operative condition of the relays 503, and these relays in turn depend, as above explained, on the positions of the tens and dollars switches 400 and 410. The switch 500, and the same is true of the other switches illustrated in this system, has twenty-one terminal positions. The switch computes the first four unit charges of each dollar in its first cycle of operation. Thereafter, and until the accumulated total reaches the next dollar, the switch 500 computes only two charges for each cycle, stepping automatically over the latter half of its bank and returning to the initial position.

In response to the first impulse from the relay 228 magnet 508 steps the wiper 502 into position 2. The terminal in this position is grounded, however, since relay 511 and 516 are both deenergized. Similarly, the third and fourth position terminals are grounded, and the switch 500 steps automatically over these terminals and comes to rest in position 5, the ground potential of this terminal having been removed by the operation of relay 507. This first computing movement of the switch 500 corresponds to a charge of four and one-half cents, and in its fifth position, which the switch has assumed, announcement circuit 608 is selected for announcing a charge of four cents, omitting the half cent. The conductors of circuit 608 appear in the fifth position terminals associated with wipers 801 and 802 of the switch 500, and these wipers are selectable, when the announcement is subsequently made, through the banks of the steering switch 300, as hereinbefore explained. When the units switch 500 passes through positions 3, 4 and 5, it closes a circuit for operating the relay 423, traceable from battery through the winding of said relay, conductor 424, wiper 501 to ground on conductor 405. Relay 423 operates and locks directly to the grounded conductor 405.

When the next metering impulse is sent, magnet 508 energizes and releases, and the wiper 502 is stepped automatically over terminals grounded by the relays 503 until the switch reaches position 10, ground having been removed from the terminal in this position by the operated relay 507. Two four-and-a-half-cent charges have now been computed, the total of which is nine cents, and the switch 500 is in position to select the announcement circuit 609 for announcing this particular charge. Inspection of the drawings will show that the conductors of circuit 609 appear in the tenth position terminals of wipers 801 and 802.

When the next metering impulse is received, switch 500 steps out of position 10 and is driven automatically into position 14 where it stops since the ground has been removed from the terminal in this position by the attracted armature of relay 507. The total charge computed now amounts to thirteen and a half cents, and wipers 801 and 802 are in engagement with the conductors of announcement circuit 713. This circuit will announce a charge of thirteen cents, omitting the half cent in the subscriber's favor.

On the next metering impulse the switch 500 is driven out of position 14 and into position 19 where it comes to rest since ground has been removed from the terminal in this position by the attracted armature of relay 507. The total accumulated charge is now eighteen cents, and the wipers 801 and 802 in position 19 select announcement circuit 714 for announcing this particular charge.

The next metering impulse moves the switch 500 out of position 19 and into position 20, the terminal of which is grounded through the closed contacts of relays 511 and 516. Thereupon the switch moves into position 21. When the switch 500 enters position 16, a circuit is closed for energizing the stepping magnet 419 and slow-release relay 409 of the tens switch 400. This circuit may be traced from battery through the windings of the magnet and relay in parallel, conductor 420, wiper 501 to ground over conductor 405. Magnet 419 and relay 409 energize and remain energized until wiper 501 moves away from its twentieth position terminal; the magnet then releases and steps the wipers of the tens switch 400 to the second position. As the wiper 402 leaves position 1 relay 406 releases and causes the release of relays 506, 306, 307, and 416. Relay 506 places ground potential on the terminals in positions 11 to 20, inclusive, of switch wiper 502. During each succeeding cycle of the switch 500, therefore, these grounded terminals will cause the switch to step automatically over positions 11 to 20 independently of the condition of relays 503. The tens switch 400 is now standing in position 2 and a circuit is closed for operating the tens relay 421 pertaining to charges between twenty and thirty cents. The circuit for this relay may be traced from battery through the winding thereof, wiper 402 (position 2) to the grounded conductor 405. When relay 416 releases, it opens the circuit of relay 507; and when relay 421 operates it closes an operating circuit for relay 510. The circuit for relay 510 may be traced from battery through the winding thereof, conductor 422, closed contacts of relay 421, conductor 418 to ground at the front contact of relay 404.

Returning now to the operation of the units switch 500, it will be recalled that this switch moved out of position 19 through position 20 and into position 21 in response to the fourth metering impulse received from the relay 228. Since, however, the twenty-first terminal associated with the wiper 502 is permanently grounded, the switch continues to step and moves back into its first position. The terminal in this position is grounded at this time over a circuit traceable through the closed contacts of relays 507 and 512, conductors 425 to ground at the contact of relay 423. Accordingly, switch 500 steps out of position 1 and continues to step until it reaches position 3 where it stops because ground potential is removed from the terminal at the open contacts of the operated relay 510. The total charge is now twenty-two and a half cents, and the switches 400 and 500 have selected the announcement circuits 715 and 610. Announcement circuit 715 appears in position 2 of wipers 701 and 702, and announcement circuit 610 appears in position 3 of wipers 801 and 802. When the announcement is subsequently made, assuming the call terminates at this point, the steering switch 300 first selects the wipers 711 and 712 and the word "twenty" is spoken, following which the steering switch selects the wipers 801 and 802, and the word "two" is spoken.

The next metering impulse steps the units switch 800 out of position 3, and it continues to step automatically until it reaches position 8, coming to rest in this position because relay 510 is operated. Six units have now been charged and a total of twenty-seven cents computed. The tens switch in position 2 selects the announcement circuit 715 for the word "twenty," and the units switch in position 8 selects the announcement circuit 611 for the word "seven."

The metering impulse for the seventh charge moves the units switch 500 out of position 8 and into position 12. Since positions 12 to 20, inclusive, are grounded at the contacts of relay 506, the switch continues to step through these positions. As switch 500 passes into position 16, it closes the operating circuit of stepping magnet 419, and it later opens this circuit when it steps out of position 20. Magnet 419 in response to this energization and release advances the tens switch 400 out of position 2 and into position 3. The wiper 402 opens the circuit of relay 421 and, in position 3, closes a similar circuit for the operation of the next tens relay 426. The release of relay 421 causes the release of relay 510, and the operation of relay 426 causes the operation of relay 511 over a circuit including conductor 427, the contacts of relay 426 and the grounded conductor 418. The switch 500, therefore, continues to step through positions 21 and 1 and comes to rest in position 2 since the grounded circuit to the terminal in this position is opened at the contacts of relay 511. A total charge of thirty-one and a half cents having been computed; the tens switch in position 3 selects the announcement circuit 716 for the word "thirty," and the units switch in position 2 selects the announcement circuit 612 for the word "one."

When the eighth charge is made, the units switch 500 moves out of position 2 and into position 7. With the tens switch in position 3 and the units switch in position 7, the appropriate announcing circuits are selected to announce the charge of thirty-six cents.

When the ninth charge is made, the units switch 500 steps out of position 7 and into position 11. Although relay 511 is operated and disconnects the eleventh position terminal from the common ground connection, the switch continues to step in a circuit closed over brush 502 to ground at the back contact of relay 506. Hence the switch passes out of position 11 and steps automatically through its succeeding positions as above described. As the switch passes through positions 16 to 20, wiper 501 closes the energizing circuit of magnet 419 as above explained. When the switch 500 moves out of position 20, magnet 419 releases and advances the tens switch 400 out of position 3 and into position 4.

The special operation just described is required to advance the units switch 500 out of position 11 and through the remainder of its cycle when the total computed charge is one having zero for the units digit. Whenever the accumulated charge acquires a zero in the units place, it will be found that the three preceding charges are computed in the same cycle of switch 500 and that the switch arrives in position 11 on the third one of these charges. Since the advance of the tens switch depends upon the completion of a cycle by the units switch, which ordinarily is completed after two successive charges, it is necessary in the special case mentioned to provide separate means for advancing the switch 500 through the remainder of its cycle to cause the consequent movement of the tens switch to the next position. More specifically it will be noted that the switch 500 stopped in positions 2, 7 and 11 for the last three charges, the tens switch 400 remaining in position 3 for each of these charges. The first two charges brought the total computation to thirty-one and a half cents and thirty-six cents respectively, and for both of these it is necessary that the switch 400 stand in its third position. The next charge, however, brings the total computation to forty and a half cents, for which the announcement of forty cents must be made. It is obvious, therefore, that the tens switch must be advanced into position 4, and to accomplish this the units switch 500 is moved out of position 11 by the relay 506 in the manner above described. When the tens switch 400 moves out of position 3 and into position 4 relay 426 is released, and the next tens relay 427 is operated. Relay 426 causes the release of relay 511 and relay 427 causes the operation of relay 512. When, therefore, the units switch passes out of position 21 and into position 1, it comes to rest since the first position terminal is free from ground potential. The tens switch 400 is now in position 4, as above explained, and the units switch 500 is in position 1. In position 4 of the switch 400 the announcement circuit 717 is selected for speaking the word "forty" and in position 1 of switch 500, the wipers 801 and 802 are standing on blank terminals since no units announcement is necessary.

Inspection of the circuits will show that the units switch 500 continues to rotate through cycle after cycle as the charges accumulate and that the tens switch 400 moves from position to position for each additional charge of ten cents. For example, at the completion of the twentieth charge the tens switch is standing in position 9 and the units switch in position 1. These positions indicate a total accumulated charge of ninety cents. In position 9 of switch 400 the tens relay 416 is reoperated in a circuit from battery through a winding of said relay, wiper 402 to ground over conductor 405. Relay 416 causes the reoperation of relay 507, removing ground from the first position terminal of wiper 502 and permitting this switch to rest in position 1. When the twenty-first metering impulse is received, the switch 500 moves out of position 1 and into position 5. In these positions of switches 400 and 500 the announcement circuits 718 and 608 are selected for making the announcement "ninety-four."

When the twenty-second metering impulse is received, switch 500 moves out of position 5 and into position 10. In this case the announcement circuits 718 and 609 are selected to make the announcement "ninety-nine," the total accumulated charge at this point being ninety-nine cents.

When the twenty-third metering impulse is received, switch 500 moves out of position 10 and steps over the remaining terminals of its bank in the manner above described. The tens switch 400 also advances out of position 9 and steps automatically under the control of its wiper 401 and the associated grounded contacts through its remaining positions, returning to its first position. When wiper 402 enters position 10, a circuit is closed from ground over conductor 405 through the wiper 402, conductor 428 and thence in parallel through the winding of relay 407 and the winding of the stepping magnet 429 to battery. The magnet 429 and relay 407 energize in this circuit, and, when the wiper 402 leaves position 14, the energizing circuit is opened and the dollars switch 410 is stepped to its second position. When switch 410 moves out of position 1 relay 404 releases, releasing in turn relay 303 and relay 507. When the tens switch 400 moves out of position 9 as just explained, tens relay 416 releases; and, when this switch returns to position 1, the relay 406 reoperates. Relay 406 in turn causes the operation of the tens relay 416, relay 306 and relay 506. Relay 506 removes ground potential from the terminals in the latter part of the units switch 500 to permit this switch to compute in a single cycle the first four charges above the first dollar. This, it will be recalled, corresponds with the operation of the units switch at the beginning of the computation. As soon as the dollars switch 410 moves into position 2 and the tens relay 416 is operated, a circuit is closed for operating relay 509. This circuit may be traced from battery through the winding of relay 509, conductor 430, contacts of relay 416, wiper 412 to ground over conductor 405. Also the relay 304 is operated in a parallel circuit extending through the wiper 412, the purpose of this relay being, as above explained, to control the inflection given the announcement of the word "dollar." With relay 509 operated and the other relays 503 released, the units switch 500 steps over the first three positions and comes to rest in position 4. The total charge is now one dollar, three and a half cents. The brushes 711 and 712 of the dollars switch in position 2 select the announcement circuit 612 to announce the word "one" preceding the word "dollar," and the units switch 500 in position 4 selects the announcement circuit 613 to announce the word "three" preceding the word "cents."

Succeeding charges are computed in the manner already described, the tens switch operating through a full cycle and the dollars switch operating a single step for each succeeding dollar added to the total. As the tens and dollars switches advance, the relays 403 and 503 are operated in varying combinations over circuits that will be clear from an inspection of the drawing, and the relays 503 control the stepping movement of the units switch 500. When the total charge reaches an amount that is more than ten dollars, the dollars switch 410 moves into position 10. In this position a circuit is closed from battery through the winding of relay 309, conductor 318, wiper 412 to the grounded conductor 405. Relay 309 operates relays 303 and 306 to ground certain terminals of the switch wiper 301 and at its own contacts moves ground potential from the terminals in positions 14, 15, 16 and 17. Under these conditions it will be found from an inspection of the circuits that the steering switch 300 will select the announcement circuits for announcing that the charge is more than ten dollars.

It will be assumed that the subscribers terminate their conversation after a total charge of one dollar, three and a half cents has accumulated and before the next charge is registered. If the calling subscriber wishes to know the charge for the call which he has just made, he may obtain this information by merely waiting for the called party to release or he may initiate the operation of the announcing mechanism himself by actuating his own switchhook. Assume first that he chooses to wait and listen at his receiver. As soon as the called party replaces his receiver on the switchhook the supervisory relay 218 releases and releases relay 219. A circuit is now closed from ground through the back contacts of relay 219, front contacts of relay 220, winding of relay 231 to battery. Relay 231 operates and locks through its inner lower contact to ground through sequence switch cams 222 and 223. Relay 231 opens the talking circuit extending toward the called subscriber's line and connects the left windings of repeating coil 202 to the talking circuit extending to the calling subscriber's line 200. A talking connection is now extended from the calling subscriber's line by way of repeating coil 202 and conductors 206 and 207 to the wipers 601 and 602 of the steering switch 300.

Relay 231 in operating also closes a circuit for starting the steering switch 300 through a cycle of operation for the purpose of connecting the talking conductors 206 and 207 in sequence to the announcement circuits selected by the computing switches. The start circuit may be traced from ground through the inner upper contact of relay 231, conductor 232, winding of relay 316 to battery. Relay 316 at its upper contact closes one point in the energizing circuit of the stepping magnet 319 of the steering switch 300. The magnet 319 does not energize, however, until the contacts 1024 are closed by the rotating cam 1025 on the announcing machine. The purpose of the cam 1025 is to step the steering switch 300 in the proper timed relation with respect to the movement of the rotating film drum 1000. The relation between the speech interval and the open and closed periods of the contacts 1024 is illustrated in Fig. 11. As soon after the operation of relay 316 as the contacts 1024 closed, magnet 319 is energized. When contacts 1024 open again, magnet 319 releases and steps the switch 300 to position 2. In this position the speech conductors 206 and 207 are extended over wipers 301 and 602 to announce circuit 1020. After an interval following the movement of switch 300 into position 2 the speech film 1005 passes under the light beam, and the words "the charge" are spoken over the talking circuit to the calling subscriber's telephone. While the film 1005 is passing under the light beam, as indicated in Fig. 11, contacts 1024 again close to energize magnet 319 preparatory to the next step of the switch 300. When this preliminary part of the announcement is completed the contacts 1024 open, the switch steps to position 3, and the next announcement circuit 1023 is rendered effective to announce the word "is."

When the switch 300 takes its next step to position 4, conductors 206 and 207 are extended over wipers 601 and 602 and conductors 614 and 615 to the wipers 711 and 712 of the dollars switch. Since the dollars switch is standing in position 2, the talking circuit is extended through the wipers 711 and 712 to announcement circuit 612, and the word "one" is spoken over the subscriber's line.

When the steering switch 300 steps out of position 4 on the next opening of the interrupter contacts 1024, the wiper 301 encounters grounded terminals in positions 5 and 6 since the relay 306 is deenergized at this time. The switch steps, therefore, to position 7 where the wipers 601 and 602 select the announcement circuit 605, and the word "dollar" with the rising inflection is spoken. On the next closure and opening of interrupter contacts 1024 the switch steps to position 8 where the wiper 301 encounters a grounded terminal since the relay 304 is operated. The switch steps at once into position 9, and the talking conductors 206 and 207 are extended over wipers 601 and 602 to the announcement circuit 616 for the word "and." In position 10 of the switch 300 the wiper 301 encounters ground potential at the contact of the operated relay 307, and the switch steps automatically into position 11. In this position the talking conductors 206 and 207 are extended over wipers 601 and 602, conductors 617 and 618 through the wipers 801 and 802 of the units switch, which is now standing in position 4, thence to the announcement circuit 613, and the word "three" is spoken over the talking connection. In position 12 of steering switch 300 the wiper 301 encounters ground potential at the back contact of relay 308, and the switch advances into position 13. Here the talking conductors 206 and 207 are extended over wipers 601 and 602 to the announcement circuit 707 and the word "cents" is spoken, thus completing the announcement which is "the charge is one dollar and three cents." On the next closure and opening of the interrupter contacts 1024, the switch 300 moves out of position 13 and steps automatically over positions 14, 15, 16, 17 and 18, since relays 309 and 310 are deenergized, and into position 19. The interrupter contacts 1024 drive the steering switch 300 through positions 19, 20 and 21 and back into its normal position, position 1. If the calling subscriber retains his receiver off the switchhook the steering switch 300 will proceed through another cycle of operation and the charge announcement will be repeated.

When the calling party replaces his receiver on the switchhook, the supervisory relays 215, 216 and 217 release, and the connection, including the finder switch F, selector S and the link L, is restored to normal. As the sequence switch 203 moves out of position 18, ground potential is removed from conductor 221, and relay 305 is released. Relay 305 and the relays of group 302, apply ground potentials to the terminals of wiper 301 and the steering switch 300 restores to its normal position. Relay 305 also applies ground potential to the terminals in the first half of the bank associated with wiper 411 and similarly to the terminals in the first half of the bank associated with wiper 401 and the switches 410 and 400 restore to their normal positions. Any operated relays in the groups 403 and 503 and any operated relays associated with switches 410, 400 and 500 release, and the units switch 500 is driven from any position it may occupy back to its normal position.

Assume that the calling subscriber, at the end of conversation, wishes to initiate the operation of the announcement mechanism without waiting for the called party to release. To do this he produces a momentary opening of his line circuit by lowering and then releasing the switchhook or by giving the impulse dial 211 a turn. The opening of the circuit releases relay 215, which in turn releases relay 216. These relays reoperate as soon as the line is reclosed; but, while relay 216 is released and the slow-releasing relay 217 is retaining its armatures, a circuit is closed from ground through the right back contact of relay 216, right front contact of relay 217 through the winding of relay 231 to battery. Relay 231 operates and locks to the sequence switch cam 222, and the calling subscriber's line is disconnected telephonically from the called subscriber's line and is extended through to the announcement circuit 206—207. The announcement equipment is started, and the announcement is made in the manner fully described hereinbefore.

Should the calling subscriber make a call for which no charge is required, the message register is not operated, and the switches of the computing mechanism remain at normal. Relays 303, 306 and 310 operate in this case, and the switch 300 is operated in such a manner at the end of the call that the announcement "no charge" is made.

While the invention has been illustrated in connection with mechanism for announcing charges to telephone subscribers it is obvious that it may also be utilized for making similar announcements to operators and for other purposes. Also it will be obvious that any suitable type of announcing mechanism may be used, such as phonographs and telegraphones.

For the purpose of illustration it has been assumed that the charge per unit of conversation is four and a half cents. This charge, however, may be fixed at any desired value, such as 2, 3, 5 or more cents per unit of time. It may also be noted that the announcing mechanism disclosed herein is provided with means for announcing the word "dollar" both with the rising and falling inflections. For the rate of charge assumed in the present disclosure, namely four and a half cents per message register operation, the word "dollar" with the falling inflection would not occur in the announcements. However, the falling inflection for this word would be required where the rate per unit of conversation is such as to make possible a total charge of an even dollar.

What is claimed is:

1. In a telephone system, subscribers' lines, means for establishing a conversational connection between a calling line and a called line, means for charging one of the subscribers an amount dependent on the duration of conversation, and automatic means controlled by said charging means to orally announce to said subscriber the amount of the charge.

2. In a telephone system, telephone lines, means for establishing a conversational connection between a calling line and a called line, means for charging the calling party an amount dependent on the duration of conversation, and an announcing mechanism controlled by said charging means for sending an oral announcement over the calling line to apprise the calling party of the amount of said charge.

3. In a telephone system, telephone lines, means for establishing a conversational connection between a calling line and a called line, means for charging the calling party an amount dependent on the duration of the conversation, and an announcing mechanism operative in response to the release of said established conversational connection for transmitting over the calling line an oral announcement apprising the calling party of the amount of said charge.

4. In a telephone system, subscribers' lines, automatic switches for setting up a connection between a calling line and a called line, timing means effective during the existence of the established connection for determining the charge to be made against the calling subscriber, and means effective at the termination of conversation and prior to the release of the calling line by said switches for sending an announcement over the calling line to inform the subscriber of the amount of the charge.

5. In a telephone system, subscribers' lines, means for interconnecting a calling line and a called line for conversation, means for making successive charges for successive intervals during the conversation, means for computing the monetary value of said charges, and means operative in response to the release of an established conversation for announcing to the calling subscriber the total computed value for the charges made during the conversation.

6. In a telephone system, subscribers' lines, means for interconnecting a calling line and a called line for conversation, means for making charges at periodic intervals throughout the conversation, means for computing the total monetary value of the charges as they accumulate, and an announcing mechanism operative in response to the release of an established conversational connection for informing the calling subscriber orally of the total computed charge for the conversation.

7. In a telephone system, a calling subscriber's line, a called subscriber's line, means for establishing a connection between said lines, means dependent upon the duration of the conversation for registering the charge to be made against the calling subscriber, sound recording media bearing speech records for expressing the varying sums charged for conversations of varying durations, means controlled by said registering means for selecting the recording media corresponding to the sum chargeable for the conversation between said subscribers, and means controlled by the selected media for transmitting to the calling subscriber an oral announcement of said sum.

8. The combination in a telephone system of a calling subscriber's line, a called subscriber's line, automatic switches for establishing a conversational connection between said lines, a message register for the calling line, charging means effective during the conversation for operating said register at periodic intervals, computing means controlled by said charging means for progressively totalizing the successive register operations in monetary units, and announcing means controlled by said computing means for transmitting an oral announcement over the calling line to apprise the calling subscriber of the total monetary value of the charge assessed against him for the conversation.

9. In a telephone system, subscribers' lines, means for establishing a conversational connection between two of said lines, means for totaling the charge to be made for the conversation, and means responsive to the release of an established conversational connection for making a spoken announcement of the total amount of the charge automatically to one of the subscribers participating in said conversation.

10. In a telephone system, a calling line, a called line, means including an automatic switch for establishing a connection between said lines, means for determining the charge to be made against the calling subscriber, an announcing mechanism controlled by said charging means for making an oral announcement of the amount of said charge, and means under control of the calling subscriber upon completion of conversation for connecting said announcing mechanism to the calling line to apprise him of the charge.

11. In a telephone system, a calling line, a called line, means including an automatic switch for establishing a connection between said lines, means for determining the charge to be made against the calling subscriber, an announcing mechanism for making an oral announcement of the amount of said charge, and means under control of the called subscriber at the end of conversation for connecting said mechanism to the calling line to announce the charge to the calling subscriber.

12. In a telephone system, a calling line, a called line, means including an automatic switch for establishing a connection between said lines, means for determining the charge to be made against the calling subscriber, an announcing mechanism for making an oral announcement of the amount of said charge, and means controlled by the calling subscriber at the end of conversation for connecting said mechanism to the calling line by way of said switch.

13. In a telephone system, a calling line, a called line, means including an automatic switch for establishing a connection between said lines, means for determining the charge to be made against the calling subscriber, an announcing mechanism for making an oral announcement of the amount of said charge, means controlled by an opening of the calling line at the end of conversation for connecting said mechanism to the calling line by way of said switch, and means controlled by a subsequent opening of the calling line for releasing said switch and said announcing mechanism.

14. In a charge announcing system, means for computing the value of the charge in monetary units of higher and lower denomination, sound recording media bearing the names of the numerals for expressing the varying values of the charges, a medium bearing the sound record of the name of said higher unit with a falling inflection, another medium bearing the name of said higher unit with a rising inflection, and means for selecting one or the other of the two latter media for a given announcement according to whether the amount is expressed in a unit or units of the higher denomination alone or in a unit or units of both denominations.

15. The combination in a communication system of a calling line, a called line, means including an automatic switch for establishing a communication connection between said lines, a service charging mechanism associated with the established connection and operable during communication over said connection to measure successive charge intervals and to calculate the total money value of said intervals, an announcing mechanism controlled by said charging mechanism for making an oral announcement of the total amount to be charged for the communication, and means under the control of the calling line at the end of the communication for automatically connecting said announcing mechanism to the calling line for the purpose of transmitting the oral announcement of the total money charge over said calling line.

16. The combination in a communication system of a calling line, a called line, means for establishing a communication connection between said lines, a service charging mechanism associated with the established connection and operable during communication over said connection to measure successive charge intervals and to calculate the total money value of said intervals, an announcing mechanism comprising sound recording media bearing the names of the numerals for expressing the varying money values of the charges, means controlled by said charging mechanism for selecting the proper media of said announcing mechanism to represent the total charge for said communication, and means controlled by said calling line at the termination of said communication for connecting the selected media of said announcing mechanism telephonically to said calling line to cause the oral announcement of the charge to be transmitted over said calling line.

17. The combination in a telephone system of a calling line, a called line, means for establishing a telephone connection between said lines, a charging mechanism for determining the total charge to be made against the calling subscriber, an announcing mechanism for making an oral announcement of the total amount of said charge, circuit means rendered effective in response to the replacement of the called subscriber's telephone provided the calling subscriber continues to hold the connection for connecting said announcing mechanism to the calling line.

18. In a telephone system, a calling line, a called line, means for establishing a conversational connection between said lines, a charging mechanism operable in accordance with the duration of the conversation for calculating the total charge to be made for said conversation, a telephone announcing mechanism, circuit means effective in response to the replacement of the called subscriber's telephone while the calling subscriber continues to hold his telephone for releasing the called line and for connecting said telephone announcing mechanism to the calling line to transmit over said calling line an oral announcement of the total value of the charge of said conversation.

19. In a telephone system, a calling line, a called line, means for establishing a conversational connection between said lines, means for determining the charge to be made against the calling subscriber for the conversation, a telephone announcing mechanism, and means responsive to an opening of the calling line by the calling subscriber before the called subscriber replaces his telephone for disestablishing the connection between said lines and for connecting said announcing mechanism to the calling line for the purpose of transmitting to the calling subscriber an oral announcement of the value of said charge.

20. In a telephone system, a calling line, a called line, means for establishing a conversational connection between said lines, means for determining the total charge to be made against the calling subscriber for the conversation, a telephone announcing mechanism, means responsive to a momentary opening of the calling line by the calling subscriber for disestablishing the connection between said lines and for connecting said telephone announcing mechanism to the calling line for the purpose of transmitting thereover an oral announcement of the total amount of the charge for said conversation, and means subsequently responsive to a prolonged opening of the calling line by the calling subscriber for effecting the release of said calling line.

HENRY M. BASCOM.
WILLIAM A. RHODES.